Aug. 24, 1965   E. L. HOFFMAN   3,202,998
FLEXIBLE FOAM ERECTABLE SPACE STRUCTURES
Filed May 16, 1962

INVENTOR
EDWARD L. HOFFMAN

BY
ATTORNEYS ative area for minimum weight and bulk in the production of certain objects designated for orbital space flight.

United States Patent Office 3,202,998
Patented Aug. 24, 1965

3,202,998
FLEXIBLE FOAM ERECTABLE SPACE STRUCTURES
Edward L. Hoffman, Newport News, Va., assignor to the United States of America as represented by the Administrator of the National Aeronautics and Space Administration
Filed May 16, 1962, Ser. No. 195,347
11 Claims. (Cl. 343—833)
(Granted under Title 35, U.S. Code (1952), sec. 266)

The invention described herein may be manufactured and used by or for the Government of the United States of America for governmental purposes without the payment of any royalties thereon or therefor.

This invention relates generally to erectable space structures, and more particularly to self-erectable structural bodies, or component parts thereof, that are designed to be placed in orbit about the earth and other celestial bodies.

In the field of space exploration a definite need has arisen for flexible lightweight spatial solar energy collectors, space reflectors, and expandable antenna structural elements constituting component parts of orbital communication vehicles. Since weight and bulk are very critical problems in the design of payloads for carrier vehicles employed in space exploration, due to the limited capabilities of present day rockets, it is desirable to obtain maximum utilizable area for minimum weight and bulk in the production of certain objects designated for orbital space flight.

One heretofore proposal, for attaining large utilizable surface areas from lightweight structures of minimum bulk, involved inflating these structures with a pressurized gas upon their being ejected from a carrier vehicle and placed in orbit about the earth. This prior art proposal, however, is very susceptible to damage from micrometeroid punctures which permit loss of the inflating medium.

Another prior art inflatable space structure proposal is illustrated in U.S. Patent No. 2,996,212 wherein, once inflated, self retention of the inflated configuration does not rely on the internal pressure of the inflating medium, but is accomplished by the inherent stiffness of the skin material. This prior art erectable structure, although quite satisfactory for the purposes contemplated by the patentee, must sacrifice part of the payload weight and bulk to provide the inflation medium source and is further considered impractical for space structures requiring relatively fixed final configurations substantially immune to micrometeoroid damage.

The present invention combines the advantageous features of both of the aforementioned prior art proposals while minimizing the disadvantages thereof. Accordingly, an object of the present invention is the provision of a new and improved erectable article of manufacture.

Another object of the instant invention is the provision of a self-erectable space structure.

A further object of the present invention is the provision of a novel self-erectable director assembly for Yagi disk antennas utilizable on space satellites.

Still another object of the present invention is the provision of an erectable space structure substantially immune to micrometeoroid damage.

A still further object of the instant invention is the provision of a new and novel method of packaging an erectable space structure.

According to the present invention, the foregoing and other objects are attained by providing an open cellular flexible foam, such for example as polyether urethane foam, as the primary support and erection mechanism for an erectable space structure. Low-density flexible foam of this type appears particularly useful in self-erectable structures due to the inherent recovery properties of the foam after being compressed for a considerable length of time. For an erectable Yagi disk antenna element, for example, only the elongated director assembly of the element will be erectable with layers of the compressible foam replacing the conventional rod in the director assembly and serving as the sole supporting structure for the spaced disks. In self erecting solar concentrators or reflectors the foam is preformed in the desired configuration and serves as a backing or support for the reflective surface. Obviously, self erectable structures of this type are substantially immune to micrometeoroid damage since there is a total absence of inflation medium capable of being lost as a result of minor punctures.

A more complete appreciation of the invention and many of the attendant advantages thereof will be readily apparent as the same becomes better understood by reference to the following detailed description when considered in connection with the accompanying drawing wherein.

Figure 1:
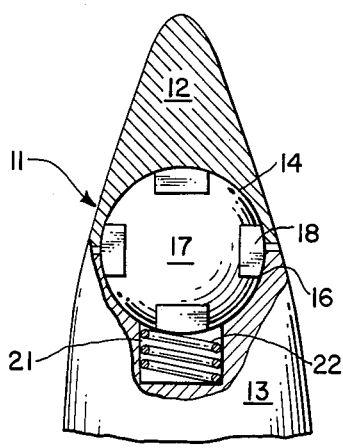
FIG. 1 is a side elevational view of a carrier vehicle payload nose cone, with parts broken away to show packaged therein a communication space satellite having a plurality of erectable antenna elements constructed in accordance with the present invention.

Referring now to the drawing, wherein like reference numerals designate identical parts throughout the several views, and more particularly to FIG. 1, there is shown a carrier vehicle generally designated by reference numeral 11 having a nose cone 12 detachably mounted upon a propelling rocket 13. The base of nose cone 12 and the forward end of rocket 13 are provided with opposing hemispherical cavities 14, 16, respectively, adapted to receive a spherical communication space vehicle 17. The exterior surface of spherical vehicle 17 is provided with a plurality of symmetrically arranged openings closed by arcuate panels or covers 18, as will be more fully explained hereinafter. A cylindrical well 21, in the forward end of rocket 13 and at the base of hemispherical cavity 16, contains a coil spring 22 maintained in compression by vehicle 17.

Rocket 13, upon initiation, carries nose cone 12 and vehicle 17 into the upper atmosphere and at a predetermined height, nose cone 12 is separated from rocket 13 by conventional means, not shown, whereupon coil spring 22 ejects spherical vehicle 17 for orbital flight.

Figure 2:
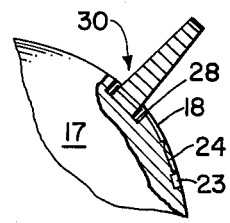
FIG. 2 is a fragmentary view, partly in section, showing one of the satellite antenna director assemblies in erected position, along with a schematic illustration of a release means therefor.

As more clearly shown in FIG. 2, when vehicle 17 is separated from rocket 15, arcuate plates 18 are slidably removed from the openings therein by conventional means, such for example as solenoid 23 and cable 24, and the erectable director assembly 29 of the vehicle antennas, shown generally by reference numeral 30, are immediately self erected.

Figure 3:
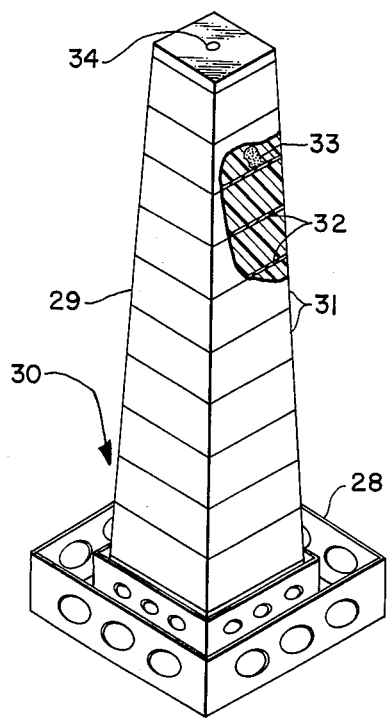
FIG. 3 is an enlarged view, partially in section, of the antenna director assembly shown in FIG. 2 along with the dipole housing therefor.

Referring now more particularly to FIG. 3, antennas 30 are of the Yagi disk design and may be erected individually or in any suitable array. Each individual antenna 30 includes a perforated dipole housing or base member 28 of suitable lightweight construction with erectable director assembly 29 replacing the support rod of conventional Yagi-type antennas. The individual components required in dipole housing 28 can vary from, for example, an array of two dipoles backed by a ground plane, to much more complex feed design when bipolarization or polarization diversity is desired, and are not shown.

Figure 4:
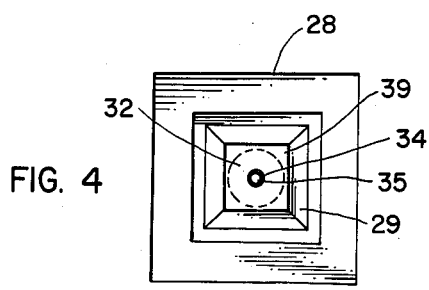
FIG. 4 is top elevation of an antenna director assembly as packaged within the dipole housing, with parts omitted for clarity; and, FIG. 5 is a view, partially in section, of an alternate embodiment of an erectable space structure, in accordance with the instant invention.

Director assembly 29, according to the present invention, is composed of a plurality of polyether urethane flexible foam spacers 31 fixedly attached to alternate thin disks 32 and dipole housing 28 by means of a conventional flexible adhesive 33. Disks 32 are formed from thin metallic sheets, such for example as 1.0 ml. sheet aluminum, 1.25 ml. perforated brass shim stock, and other equivalent materials. One specific example of the director assembly embodiment illustrated in FIG. 3, is formed as a frustum of a pyramid 4.0 inches at the base and tapering over a length of 25.10 inches to 2.70 inches at the top; and readily compressible at a 12:1 ratio to a height easily enclosed within the internal five-inch square compartment of dipole housing 28, which has a depth of 2.18 inches. The exterior of dipole housing 28 is eight inches square leaving adequate space for the desired dipole arrangement therein exteriorly around the compressed director assembly 29, as shown more particularly in FIG. 4. A one-quarter inch diameter hole 34 is provided through the center of the alined elements of director assembly 29 to aid in packaging thereof in the compressed condition, as will be further explained hereinafter. The thickness of each individual spacer 31 in the embodiment described is 2.05 inches before compression with the exception of the exposed end which is 0.5 inch, with the overall configuration of each individual spacer also being frusto-pyramidal.

The above described example is given as exemplary only and variations in size, length, and disk spacing are obviously within the scope of this invention when desirable for more efficient operation. For example, although the embodiment illustrated in FIG. 3 employs metallic disk elements 32 of progressively decreasing diameter from the base to a 2.5 inch diameter at the tip of assembly 29, they can be replaced by uniform diameter disks of, for example, 2.5 inch diameter while retaining the frusto-pyramidal spacer configuration described hereinabove, without impairing the erectability or the function of erectable director assembly 29 for an antenna. It is further within the scope of the present invention to fabricate the entire director assembly 29 of uniform cylindrical configuration, although this structure would be less desirable than the pyramidal element in the presence of continually repeated forces tending to deflect the erected element. Excellent damping properties are inherently achieved by each of the above described embodiments upon being subjected to vibration, such for example as encountered during induced satellite directional changes, as a result of the inherent physical recovery ability of foam spacers 31.

The polyether urethane foam grain structure has a direct relation to the recovery ability of the foam after compression, and the best recovery is obtained when spacers 31 are cut so that the packaging load acts directly across the grain.

Director assemblies 29 constructed in accordance with this invention from polyether flexible urethane foam having a density of 1.0–1.7 pound/cu. ft. and, when compressed at a 12:1 ratio for approximately 24 hours, recover immediately upon release to within 10 percent of their original length. Gradual and continuous recovery is experienced thereafter over a period of approximately six hours to within 3 percent of the original length, which is well within the allowable tolerances for antenna director assemblies. Also, where available space permits it and, the compression ratio required is less than 12:1, as for example 7:1, or 10:1, the erection recovery, after compression, is more rapid and more complete.

As mentioned heretofore, each of the spacers 31 and disks 32 are provided with a central perforation 34 to aid in packaging of the director ssembly 29. Immediately prior to the insertion of spherical vehicle 17 within carrier vehicle 11, antennas 30 are connected therein with director assemblies 29 being in the erect position. A metal rod 35, having a length at least equal that of the erected structure is next inserted within openings 24, to prevent misalinement of disks 32 during the packaging thereof. The entire erectable column 29 may then be compressed into the inner compartment of dipole housing 28 by any suitable manner, such as by exerting hand pressure longitudinally on the column through a rigid centrally perforated plate 39, which may be slidably positioned about rod 35 to aid in compressing and packaging of director assembly 29. After element 29 is compressed, rod 35 is removed and plate 39 maintains assembly 29 in compression by bearing against sliding arcuate panel 18 which is positional over the compact assembly after compression to retain the director assembly packaged until erection is desired. Also, if desired, plate 39 may be removed and the compressed structure 29 permitted to bear directly against arcuate panel 18. As discussed hereinbefore, when spherical vehicle 17 is ejected from carrier vehicle 11 for orbital flight, individual solenoid units 23 are initiated by conventional signal means, not shown, to act on cables 24 and effect slidable removal of arcuate panels 18 and the simultaneous release of director assemblies 29, which immediately become self-erected to thereby place antennas 30 in operative position. When director assemblies 29 are erected, package plates 39 are expelled into space by the erecting force of the previously compressed column.

Figure 5:
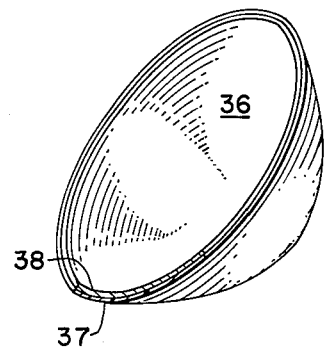

Referring now more particularly to FIG. 5, a self-erectable space vehicle 36, such for example as a paraboloidal reflector for electromagnetic waves, may be constructed according to the present invention by providing a preformed layer of polyether urethane foam 37 having a dish-like configuration and provided with a thin reflecting surface coating 38. Surface coating 38 may be an electro-deposited metal applied directly to foam 37 or a thin metallic film, such for example as aluminum, adhesive bonded to the foam. A space reflector 36 constructed in this manner is readily foldable and compressed at a 12:1 ratio for packaging within a low volume internal compartment of a suitable carrier vehicle, such as that shown in FIG. 1, capable of placing the reflector in orbit about the earth and other celestial bodies.

Obviously many modifications and variations of the present invention are possible in the light of the above teachings. For example, the self-erectable structures described herein may find obviously utility as the support and erection mechanism for expandable fins in high speed aircraft and other guidance and support members of re-entry space vehicles. It is therefore to be understood that within the scope of the appended claims the invention may be practiced otherwise than as specifically described.

What is claimed as new and desired to be secured by Letters Patent of the United States is:

1. In combination with an antenna, a director assembly, said director assembly comprising a housing, an elongated structure attached to said housing and capable of being compressed at a ratio of at least 12:1 for storage in said housing, sai delongated structure having the inherent physical property characteristic of immediate self-erection to substantially its original size upon being relieved from compression, said elongated structure including a plurality of metallic disk elements, each disk element being adhesively bonded on opposite surfaces thereof to individual plastic foam spacer elements to form a unitary column, said column having as each of its end portions one of said plastic foam spacer elements, said metallic disk elements functioning electrically as director elements for said antenna.

2. A director assembly according to claim 1 wherein each of said individual foam spacer elements are of a different size frusto-pyramidal configuration, and said spacer elements further being arranged in symmetrical decreasing size relationship to thereby produce a substantially overall frusto-pyramidal configuration for said elongated structure.

3. A director assembly according to claim 2 wherein said foam spacer elements are formed of a low density polyether urethane flexible foam.

4. In combination with an antenna for use in an extraplanetary spatial environment, a self-erectable director assembly, said director assembly comprising: a frusto-pyramidal configuration formed from a plurality of alternate disk and spacer means adhesively bonded together, said spacer means comprising a low density compressible plastic foam and each said disk means being a thin metallic sheath, said disk means functioning electrically as director elements of said antenna.

5. In combination with an antenna, a director assembly, said director assembly comprising: a base member, a unitary compressible frusto-pyramidal column adhesively bonded to said base member; said unitary compressible column including, a plurality of unequal diameter frusto-pyramidal plastic foam spacer elements, each said spacer element, save one, being of equal thickness and arranged in progressively decreasing size in symmetrical adjacent relationship, a plurality of equal thickness, unequal diameter, metallic disk elements individually adhesively securing adjacent spacer elements together, said one foam element forming an exposed end member for said unitary column and being of a fraction thickness of said other spacer elements said metallic disk elements functioning electrically as director elements for said antenna.

6. An article of manufacture by which a Yagi disk-type antenna may be transported in a compact package from one site to a site of expected use, which comprises: an antenna housing and a compressible self-erectable director assembly for said antenna in compressible relationship within said housing, said erectable director assembly being formed of a plurality of metallic disk elements connected in spaced relationship into a unitary elongated structure by a plurality of plastic foam spacer elements individually adhesively joined thereto, the end portions of said unitary structure being formed by one of said spacer elements, each said spacer element having the physical property characteristic of immediate self-erection to essentially its original size after being compressed at a ratio of at least 12:1 for a predetermined length of time whereby, said erectable director assembly may be compressed within said antenna housing in operative position therewith for transportation from one site to a site of use and upon compression release at said site of use, said director assembly will immediately assume an erect operable position.

7. An article of manufacture according to claim 6 wherein said plastic foam spacer elements are formed of a low-density polyether urethane flexible foam.

8. An article of manufacture according to claim 7 wherein said polyether urethane foam spacers are constructed and arranged in such position that the compression load acts essentially directly across the grain structure thereof.

9. A method of compactly packaging a director assembly for a Yagi disk-like antenna for easy transportation from the site of manufacture to a different site of proposed use which comprises, providing a centrally perforated unitary elongated antenna director assembly of frusto-pyramidal configuration formed from alternate metallic and plastic foam sections adhesively bonded together, with said plastic foam sections being selected and arranged so that a vertical compression load applied to the frusto-pyramidal configuration will act essentially directly across the grain structure of said individual foam sections; adhesively bonding the base of said assembly configuration within a compartment of an assembled antenna housing, said compartment having a depth at least one twelfth the length of said assembly configuration; inserting an elongate rod of a length at least equal that of said assembly configuration within said central perforation, slidably positioning a centrally perforated plate member about said rod in abutting relationship with the exposed plastic foam end section of said assembly, exerting a compression force on said centrally perforated plate member sufficiently to compress said assembly within said housing compartment, removing said elongate rod and, slidably positioning an arcuate panel member over said perforated plate to thereby close said housing compartment and maintain said director assembly in packaged compression until said arcuate panel member is removed; whereupon, said compressed director assembly will immediately self-erect itself into substantially its original elongated condition due to the inherent recovery properties of said plastic foam sections, and said perforated plate will be ejected therefrom by the erection force.

10. In combination with an antenna for use in an extraplanetary spatial environment, a self-erectible director assembly, said director assembly comprising: a unitary configuration formed from a plurality of alternative conductive and dielectric means secured together in intimate relationship, said dielectric means comprising a compressible flexible foam and said conductive means functioning electrically as director elements for said antenna.

11. A self-erectable space vehicle comprising:
  a paraboloidal reflector for electromagnetic waves, said reflector including
    (1) a paraboloidal layer of plastics foam and
    (2) a reflective metallic surface coating on said foam,
  said reflector also having the inherent physical property characteristics of
    (a) being readily foldable and compressed at substantially a 12:1 ratio for packaging within a low volume internal compartment of a suitable carrier vehicle and
    (b) of becoming self-erected into paraboloidal state upon being released from the packaged compressed state.

References Cited by the Examiner
UNITED STATES PATENTS
2,241,139  5/41  Julien et al. _____ 248—7
2,264,895  12/41  Starr _____ 248—7
2,983,504  5/61  Renter.

HERMAN KARL SAALBACH, *Primary Examiner.*